United States Patent
Pajukoski et al.

(10) Patent No.: US 10,939,418 B2
(45) Date of Patent: Mar. 2, 2021

(54) APPARATUS AND METHOD FOR SUBFRAME ARRANGEMENT

(71) Applicant: Nokia Technologies Oy, Espoo (FI)

(72) Inventors: Kari Pajukoski, Oulu (FI); Esa Tiirola, Kempele (FI); Sami-Jukka Hakola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/337,211

(22) PCT Filed: Sep. 21, 2017

(86) PCT No.: PCT/IB2017/055739
§ 371 (c)(1),
(2) Date: Mar. 27, 2019

(87) PCT Pub. No.: WO2018/060816
PCT Pub. Date: Apr. 5, 2018

(65) Prior Publication Data
US 2019/0297614 A1   Sep. 26, 2019

Related U.S. Application Data

(60) Provisional application No. 62/402,934, filed on Sep. 30, 2016.

(51) Int. Cl.
*H04L 5/00* (2006.01)
*H04W 88/02* (2009.01)
*H04W 72/04* (2009.01)

(52) U.S. Cl.
CPC ....... *H04W 72/0406* (2013.01); *H04L 5/0007* (2013.01); *H04L 5/0053* (2013.01); *H04W 72/0453* (2013.01); *H04W 88/02* (2013.01)

(58) Field of Classification Search
CPC ............................ H04L 5/0007; H04W 88/02
See application file for complete search history.

(56) References Cited

U.S. PATENT DOCUMENTS

| | | | | |
|---|---|---|---|---|
| 2009/0010240 | A1* | 1/2009 | Papasakellariou | H04L 5/0082 370/344 |
| 2011/0310855 | A1* | 12/2011 | Yin | H04L 1/0067 370/336 |

(Continued)

FOREIGN PATENT DOCUMENTS

| | | |
|---|---|---|
| EP | 2819337 A1 | 12/2014 |
| WO | 2017/188803 A2 | 11/2017 |
| WO | 2017/209585 A1 | 12/2017 |

OTHER PUBLICATIONS

"New SID Proposal: Study on New Radio Access Technology", 3GPP TSG-RAN meeting #71, RP-160671, Agenda: 9.1, NTT Docomo, Mar. 7-10, 2016, 8 pages.

(Continued)

*Primary Examiner* — Angel T Brockman
(74) *Attorney, Agent, or Firm* — Harrington & Smith

(57) ABSTRACT

One embodiment is directed to a method comprising generating at least one symbol of a subframe for control information based on a first subcarrier spacing; generating at least one data symbol of the subframe based on a second subcarrier spacing; and transmitting the subframe comprising the at least one symbol for control information and at least one data symbol. Another embodiment is directed to a method comprising receiving a subframe comprising at least one symbol for control information and at least one data symbol; decoding the at least one symbol for control information based on a first subcarrier spacing; and obtaining from the decoded at least one symbol information regarding a second subcarrier spacing used on the at least one data symbol.

18 Claims, 6 Drawing Sheets

(56) References Cited

U.S. PATENT DOCUMENTS

2015/0282167 A1* 10/2015 Lahetkangas ......... H04L 5/0044
370/329
2017/0366311 A1 12/2017 Iyer et al.

OTHER PUBLICATIONS

"3rd Generation Partnership Project; Technical Specification Group Radio Access Network; Study on Scenarios and Requirements for Next Generation Access Technologies; (Release 14)", 3GPP TR 38.913, V0.4.0, Jun. 2016, pp. 1-35.
"Scaled Numerology Control Design for NR", 3GPP TSG-RAN WG1, Meeting #86, R1-166363, Agenda: 8.1.3.1, Qualcomm Incorporated, Aug. 22-26, 2016, pp. 1-10.
"On the DL Control Channel Structure for NR", 3GPP TSG-RAN Working Group 1 meeting #86 Bis, R1-16xxxx, Agenda: x.x.x.x, Nokia, Oct. 10-14, 2016, 4 pages.
International Search Report and Written Opinion received for corresponding Patent Cooperation Treaty Application No. PCT/IB2017/055739, dated Feb. 2, 2018, 15 pages.
"Discussion on NR Numerology", 3GPP TSG-RAN WG1, Meeting #85, R1-165525, Agenda: 7.1.4, KT Corp, May 23-27, 2016, 5 pages.
"On Downlink Control Channel Design for New Radio", 3GPP TSG-RAN WG1, Meeting #86bis, R1-1610379, Agenda: 8.1.7.1, Convida Wireless, Oct. 10-14, 2016, 4 pages.
"Initial Evaluation Result for NR Numerology", 3GPP TSG-RAN WG1, Meeting #85, R1-165431, Agenda: 7.1.4, LG Electronics, May 23-27, 2016, 14 pages.
Extended European Search Report received for corresponding European Patent Application No. 17855098.4, dated May 8, 2020, 8 pages.
"Subcarrier Spacing Design for Data and Reference Signal", 3GPP TSG RAN WG1 Meeting #86, R1-166609, Agenda: 8.1.3.1, OPPO, Aug. 22-26, 2016, 7 pages.
NEC; "Discussion on numerology multiplexing"; R1-166637; 3GPP TSG RAN WG1 Meeting #86; Gothenburg, Sweden, Aug. 22-26, 2016; whole document (2 pages).

* cited by examiner

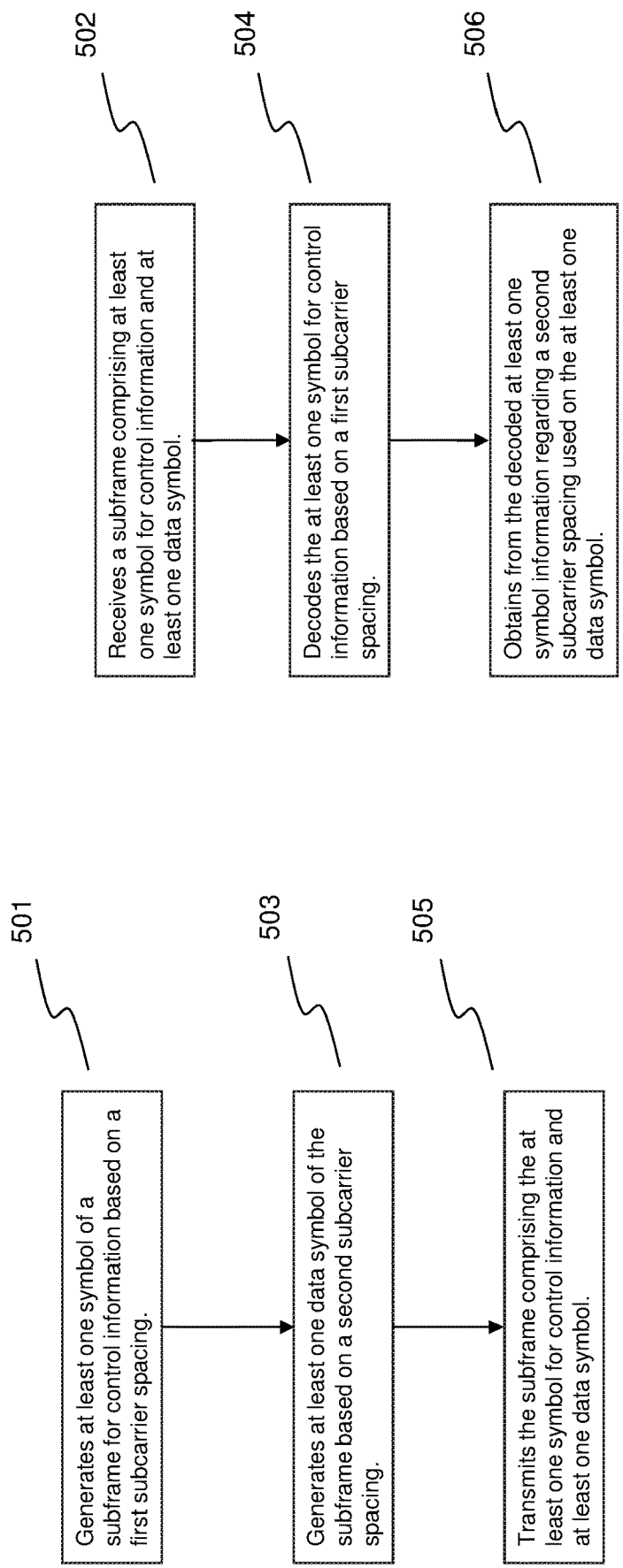

APPARATUS AND METHOD FOR SUBFRAME ARRANGEMENT

RELATED APPLICATION

This application was originally filed as Patent Cooperation Treaty Application No. PCT/IB2017/055739 filed Sep. 21, 2017 which claims priority benefit to U.S. Provisional Patent Application No. 62/402,934, filed Sep. 30, 2016.

CROSS-REFERENCE TO RELATED APPLICATION

This application is related to and claims the benefit and priority of U.S. Provisional Patent Application No. 62/402,934, filed Sep. 30, 2016, the entirety of which is hereby incorporated herein by reference.

TECHNICAL FIELD

The present application relates generally to an apparatus and a method for novel subframe arrangement to allow dynamic scheduling between different numerologies.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

Third generation partnership project (3GPP) 5$^{th}$ generation (5G) technology is a new generation of radio systems and network architecture that can deliver extreme broadband and ultra-robust, low latency connectivity. 5G can improve the telecommunication services offered to the end users, and help support massive machine-to-machine (M2M) communications. 5G is also expected to increase network expandability up to hundreds of thousands of connections. The signal technology of 5G is anticipated to be improved for greater coverage as well as spectral and signaling efficiency.

A study item has been established in 3GPP for 5G new radio (NR) physical layer design. An objective of the study item is to identify and develop technology components needed for NR systems being able to use any spectrum band ranging at least up to 100 GHz. The goal is to achieve a single technical framework addressing all usage scenarios, requirements and deployment scenarios. 5G NR provides support for multiple numerologies. It has been agreed that forward compatibility of NR shall ensure smooth introduction of future services and features with no impact on the access of earlier services and user equipments (UEs). Hence, multiplexing different numerologies within a same NR carrier bandwidth (from the network perspective) needs to be supported. Frequency division multiplexing (FDM) and/or time division multiplexing (TDM) can be considered.

Downlink (DL) control information (DCI) transmitted by evolved NodeB (eNB) is used e.g. for conveying DL and uplink (UL) scheduling information to UE. For 5G NR network, a scheme for conveying DCI for multiple numerologies within an NR carrier needs to be designed.

SUMMARY

According to a first embodiment, a method can include generating at least one symbol of a subframe for control information based on a first subcarrier spacing; generating at least one data symbol of the subframe based on a second subcarrier spacing; and transmitting the subframe comprising the at least one symbol for control information and at least one data symbol.

According to a second embodiment, a method can include receiving a subframe comprising at least one symbol for control information and at least one data symbol; decoding the at least one symbol for control information based on a first subcarrier spacing; and obtaining from the decoded at least one symbol information regarding a second subcarrier spacing used on the at least one data symbol.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

BRIEF DESCRIPTION OF THE DRAWINGS

For a more complete understanding of example embodiments of the present invention, reference is now made to the following descriptions taken in connection with the accompanying drawings in which:

FIGS. 5a and 5b illustrate flowcharts in accordance with example embodiments of the application.

DETAILED DESCRIPTION

Figure 1:
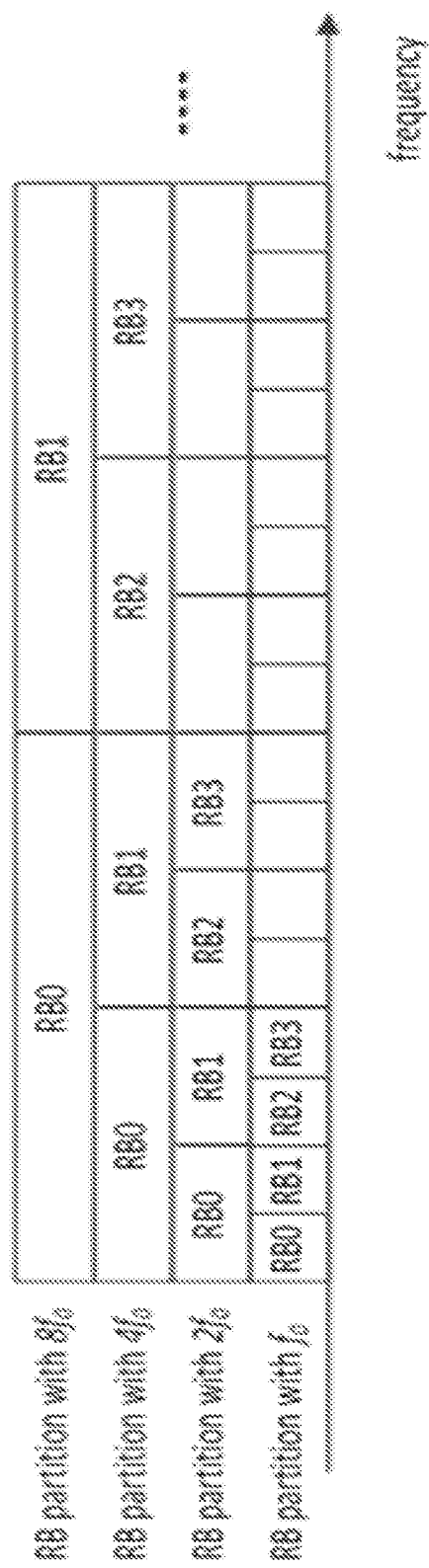
FIG. 1 illustrates resource block (RB) partitions for different numerologies in accordance with an example embodiment of the application.

3GPP considers 15 kHz and scale factors $N=2^n$, $n \in [\ldots, -2, -1, 0, 1, 2, \ldots]$ for subcarrier spacing as the baseline design assumption for the NR numerology. For the numerology with 15 kHz and larger subcarrier spacing (SCS), 1 mini-second (ms) alignment is supported. It has been agreed that in one carrier when multiple numerologies are time domain multiplexed, resource blocks (RBs) for different numerologies are located on a fixed grid relative to each other. For subcarrier spacing of $2^n \times 15$ kHz, the RB grids are defined as the subset/superset of the RB grid for subcarrier spacing of 15 kHz in a nested manner in the frequency domain. FIG. 1 shows example RB partitions for different numerologies in accordance with an example embodiment of the application, where $f_0$ denotes the smallest possible subcarrier spacing, such as for example, 15 kHz in the 5G baseline design, or in some other scenario, 3.75 kHz.

Figure 2:
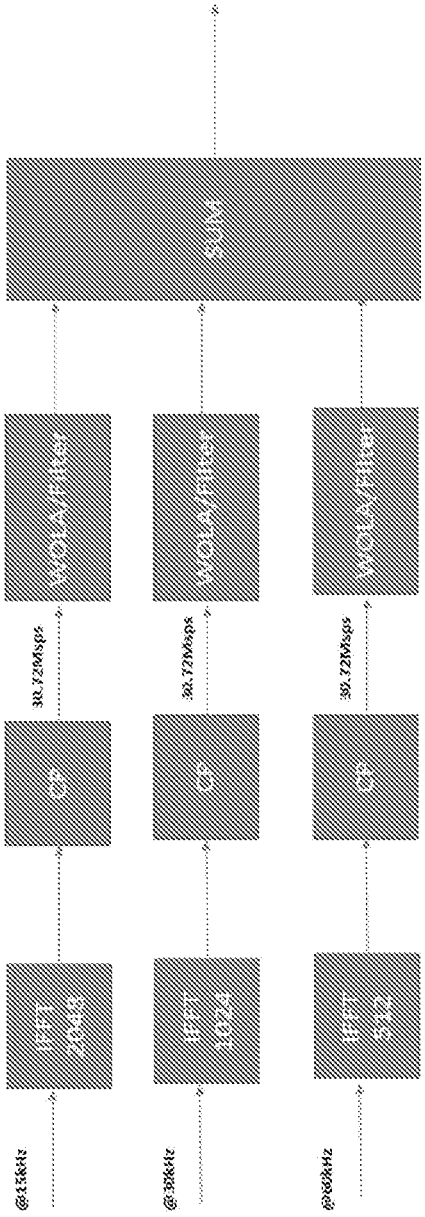
FIG. 2 illustrates downlink signal generation assuming three different numerologies in accordance with an example embodiment of the application.

The above agreements indicate that multiple numerologies need to be supported within the same NR carrier bandwidth (BW). On the other hand, based on the current working assumptions, NR numerology scaling is based on 15 kHz baseline design scaled by a factor of $N=2^n$, $n \in [\ldots, -2, 1, 0, 1, 2, \ldots]$. In an example embodiment, one numerology is defined at least by a cyclic prefix (CP) duration and a subcarrier spacing of an orthogonal frequency division multiplexing (OFDM) system. As an example, downlink signal assuming three different CP-OFDM numerologies can be generated as depicted in FIG. 2 for n=0, 1, 2, where the clock rates, OFDM symbol durations (Ts), the (inverse) fast Fourier transform ((I)FFT) sizes, maximum BW allocations, numbers of symbols per subframe, subframe lengths, CP lengths and CP overhead percentages for subcarrier spaces of 15 KHz, 30 kHz and 60 kHz are listed, respectively. WOLA in FIG. 2 refers to weighted-overlap-and-add windowing technique, a popular implementation adopted in various communication systems such as for example, 3GPP long term evolution (LTE).

Rationale for using different numerologies within the same band is typically justified by providing simultaneous support for both mobile broadband (MBB) and ultra-reliable and ultra-low-latency (URLLC) services. The latter service calls for short symbols to enable low latency whereas MBB service may require wide area coverage support. In above example numerology set illustrated in FIG. 2, MBB would operate using 15 kHz subcarrier spacing while URLLC could operate using 60 kHz subcarrier spacing.

In LTE, physical downlink control channel (PDCCH) or enhanced physical downlink control channel (ePDCCH) carries DCI, which may include resource assignment and other control information for a UE or group of UEs. Each (e)PDCCH is transmitted using one or more control channel elements (CCE). Different (e)PDCCH sizes with different CCE aggregation levels (comprising 1, 2, 4 or 8 CCEs, respectively) are supported in LTE release 8 (Rel-8).

UE needs to decode all possible (e)PDCCH sizes and locations in order to act on those messages with correct cyclic redundancy check (CRC) scrambled with a UE identity. Carrying out such blind decoding of all possible combinations of (e)PDCCH sizes and locations in every subframe would lead to excessive power consumption and processing time requirements at the UE side as well as increased probability of false UL/DL grant detection. In order to limit the number of blind decoding attempts, LTE system has adopted such an approach where only a limited set of CCE locations where a (e)PDCCH may be placed is defined for each UE (this is made at the expense of (e)PDCCH scheduling flexibility). The limited CCE set is considered as a (e)PDCCH search space, which is divided into common part with 6 (e)PDCCH candidates and dedicated part with 16 candidates, respectively. These candidates need to be decoded twice as there are two size options defined for the (e)PDCCH both in common and in dedicated search space. This gives the maximum number of (e)PDCCH blind decoding attempts as 44, which the LTE Rel-8 UE is required to carry out in any subframe. UE's (e)PDCCH blind detection capability increases linearly with the number of DL component carriers (CCs) supported in LTE carrier aggregation (i.e. Rel-10 and beyond).

Downlink control signaling principles defined in LTE form the baseline also for NR. On the other hand, conventional LTE has been designed to support just one numerology. It is not fully straightforward to extend the current DL control signaling framework to support also scenarios with multiple numerologies. In principle, each numerology option will increase the UE's DCI detection burden linearly. Moreover, the UE may not be able to decode multiple numerologies simultaneously with current delay budget and current hardware. A design for supporting multiple numerologies without additional hardware at the receiver is desired.

In an example embodiment, a subframe and DCI arrangement is proposed to enable network element (NE) such as for example, an eNB, to schedule different numerology options dynamically without an UE requirement to decode multiple numerologies simultaneously. Numerology can be allocated in subframe basis via NE scheduling.

In an example embodiment, a subframe containing DCI includes at least one symbol with predetermined subcarrier spacing regardless of the subcarrier spacing used on the rest of the subframe. For example, when 15 kHz subcarrier spacing is used for data symbol of a subframe, the at least one symbol containing DCI may be transmitted/received by using 60 kHz subcarrier spacing. In an example embodiment, the at least one symbol may be the first symbol(s) of the subframe. The number of symbols with predetermined subcarrier spacing depends on the subframe length and/or subcarrier spacing used for data.

In an example embodiment, the DCI included in the at least one symbol of subframe contains at least information about subcarrier spacing used in the rest of the subframe.

In an example embodiment, the at least one symbol containing DCI (or at least part of DCI) may be transmitted/received by using a smaller FFT than data symbols. A UE may adjust it receiver bandwidth in such that a smaller receiver bandwidth is used to receive the at least one symbol.

Figure 3:
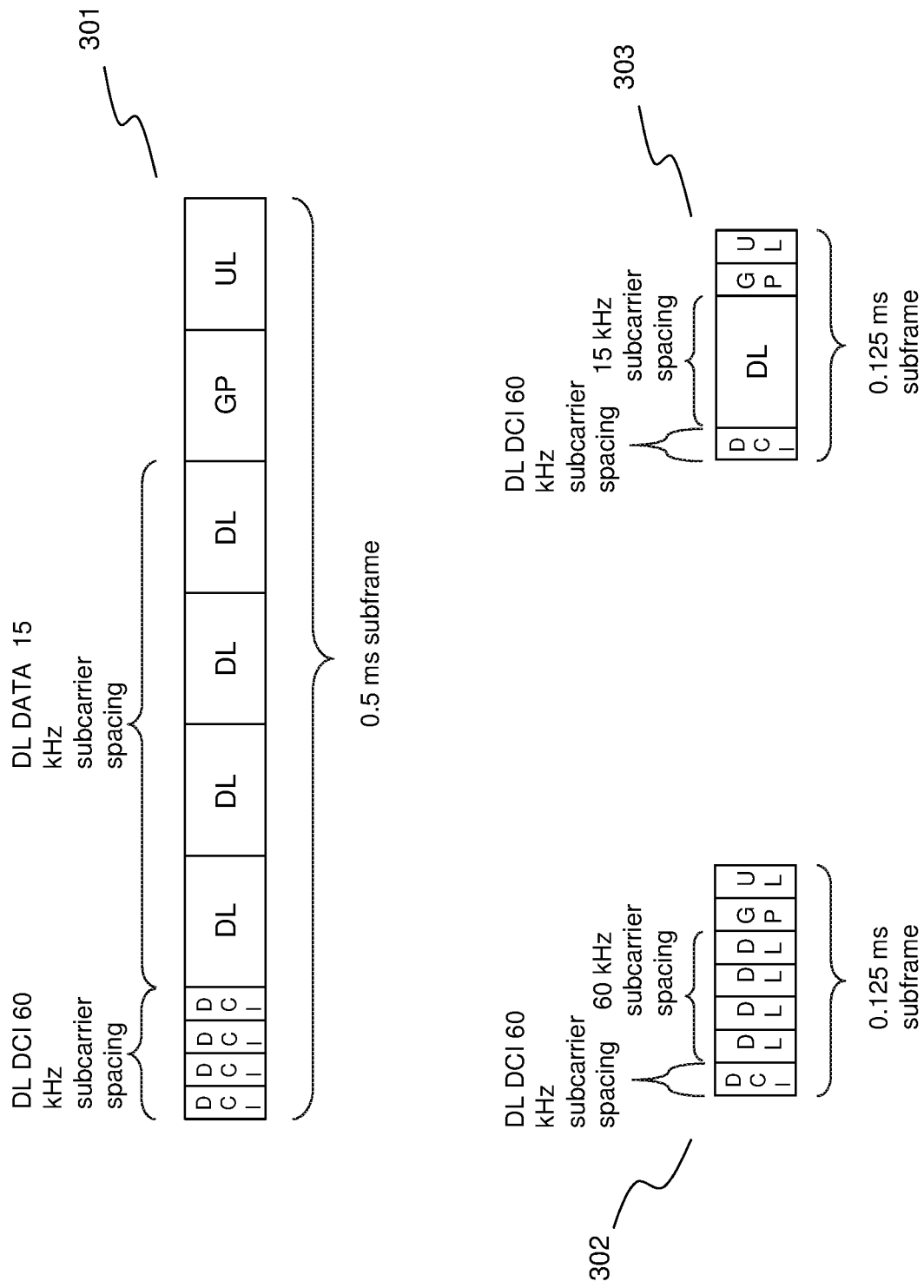
FIG. 3 illustrates subframe structures in accordance with example embodiments of the application.

The example of subframe structures in accordance with various example embodiments of the application for 15 and 60 kHz data subcarrier spacing are shown in FIG. 3. It should be noted that the term "subframe" is just an example of possible name for the considered time unit. For example, "slot" or 'NR subframe" could be equally applicable terms. Regardless of the numerology selected for data channel, the subcarrier spacing of the first symbol is 60 kHz in this example. FIG. 3 presents example bidirectional subframe structures with DL data portion (symbols denoted by "DL") according to the application. The symbol denoted by "GP" refers to guard period and the symbol denoted by "UL" refers to uplink control or/and data symbol of the subframe. Invention can be applied also for other subframe types like DL only, UL only or bi-directional subframe with UL data portion. In the various subframe types with different TDM combinations of DL control (DCI), DL data, GP and UL control or/and data, under the principle of numerology scaling based on scaling parameter ($N=2^n$), numerology can be selected separately for each portion.

With data symbols of 15 kHz subcarrier spacing, the DCI can be detected by using a smaller FFT size compared with that used for data symbols, for example, 512 FFT for DCI symbol and 2048 FFT for data symbol. Another option is to use the same FFT size for both control and data symbols, which corresponds to approach for having larger bandwidth for control channel Note that the numbers of DCI symbols in 301 and 303 are 4 and 1, respectively, due to the different subframe lengths, even though 15 kHz SCS is used for DL data in both cases.

In the example subframe structures of FIG. 3, there is UL portion in the end of bi-directional subframes (301, 302, 303). It may be used for conveying Physical uplink control channel (PUCCH) carrying different uplink control information (UCI) types such as hybrid automatic repeat request (HARQ) feedback, scheduling request, channel station information (CSI) feedback and their combinations via PUCCH. Additionally, it may be possible to multiplex PUCCH with sounding reference signal (SRS) within the UL control symbol(s). In an example embodiment, the UL portion may multiplex UL control and UL data. The subcarrier spacing for UL portion varies in examples 301, 302, 303. The SCS may be selected independently from the subcarrier spacing applied for data part (and/or DL control part). For example, in 303, subcarrier spacing for UL portion is 60 kHz whereas DL data part utilizes 15 kHz subcarrier spacing. Another example in 301 illustrates the scenario where both DL data and UL portion utilize the same subcarrier spacing (15 kHz). Another option for UL portion arrangement in 301 would be to have four UL control symbols with 60 kHz subcarrier spacing (this example is not shown). With data symbols of 15 kHz subcarrier spacing, the UL control symbols can be processed by using a smaller FFT size compared with that used for data symbols, for example, 512 FFT for UL control symbols and 2048 FFT for data symbol. Another option is to use the same FFT size for both control and data symbols, which corresponds to approach for having larger bandwidth for control channel.

Figure 4A:
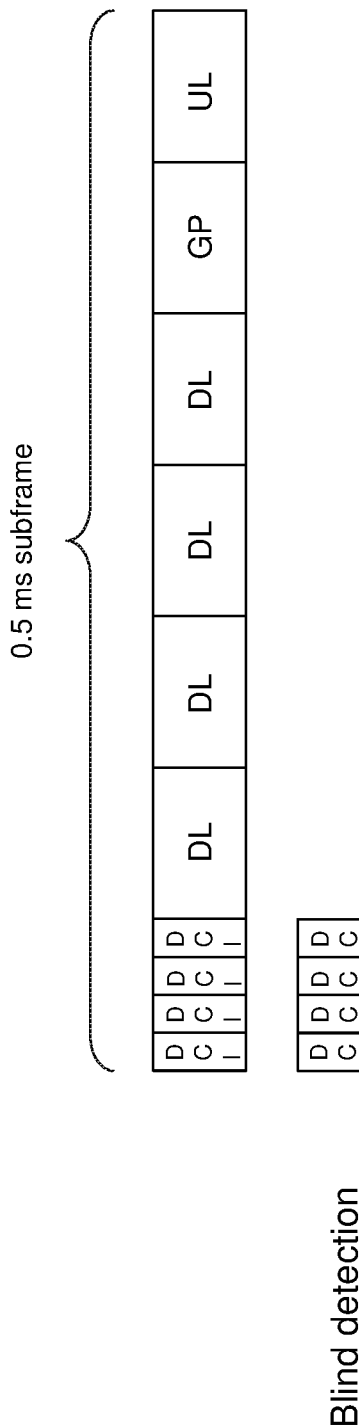
FIGS. 4a and 4b illustrate subcarrier spacing adaptation and corresponding blind detection in accordance with example embodiments of the application.
Figure 4B:
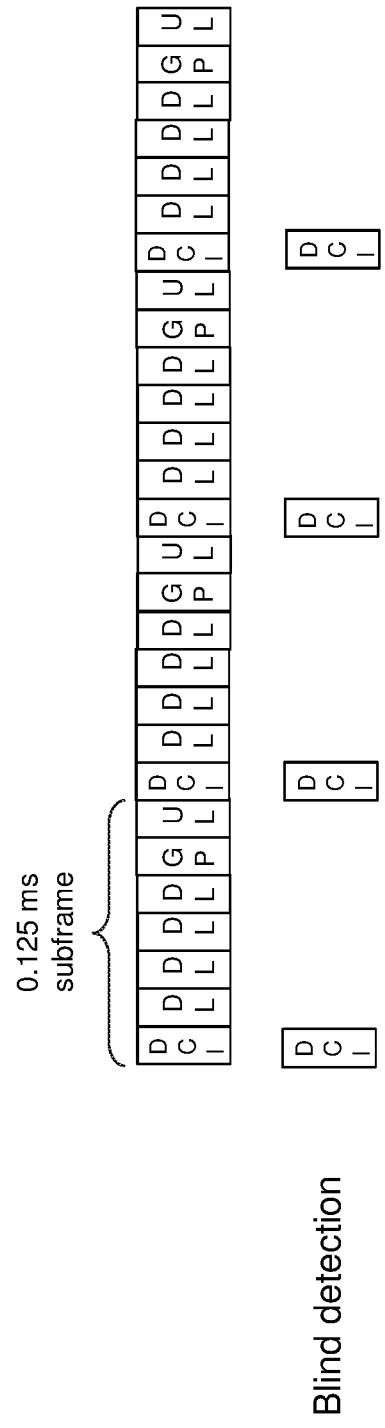

UE blind detection operation is illustrated in FIGS. 4a and 4b in accordance with various example embodiments of the application for 15 and 60 kHz data subcarrier spacing. Similar to FIG. 3, regardless of the numerology selected for data channel, the subcarrier spacing of the DCI symbol is 60 kHz. The first one or more control symbols of a subframe conveys the information on the subcarrier spacing for remaining blocks of the subframe. In an example embodiment, if subcarrier spacing is 15 kHz for data and subframe length is 0.5 ms or approximately 0.5 ms (e.g. the subframe structure 301 of FIG. 3), then (e)PDCCH blind detection is performed based on the first four symbols (each with 60 kHz SCS) of the subframe, as illustrated in FIG. 4a. In another example embodiment, if subcarrier spacing is 60 kHz for data (e.g, the subframe structure 302 of FIG. 3), or subframe length is 0.125 ms or approximately 0.125 ms (e.g, the subframe structure 303 of FIG. 3), then (e)PDCCH blind detection is performed based on the four DCI symbols each from one of four subframes, as illustrated in FIG. 4b.

FIGS. 5a and 5b illustrate flowcharts in accordance with various example embodiments of the application. In the example of FIG. 5a, a network element, such as for example, an evolved NodeB (eNB), generates at least one symbol of a subframe for control information based on a first subcarrier spacing at step 501. The first subcarrier spacing may be predetermined or configured by standard specification, manufacturer, network operator, or dynamic signaling (such as higher layer signaling). The NE also generates at least one data symbol of the subframe based on a second subcarrier spacing at step 503. The first and the second subcarrier spacing may be same or different. The control information carried by the at least one symbol for control information contains at least information regarding the second subcarrier spacing. This may be conveyed e.g. in the form of common DCI, or a separate signal multiplexed in the resource elements of the at least one symbol. At step 505 NE transmits the subframe comprising the at least one symbol for control information and the at least one data symbol.

In the example of FIG. 5b, a user equipment receives a subframe comprising at least one symbol for control information and at least one data symbol at step 502. At step 504, the UE decodes the at least one symbol for control information based on a first subcarrier spacing. The first subcarrier spacing may be predetermined or configured by standard specification, manufacturer, network operator, or dynamic signaling (such as higher layer signaling). The UE obtains information regarding a second subcarrier spacing that is used on the at least one data symbol, from the decoded at least one symbol for control information at step 506. The first and the second subcarrier spacing may be same or different.

Figure 6:
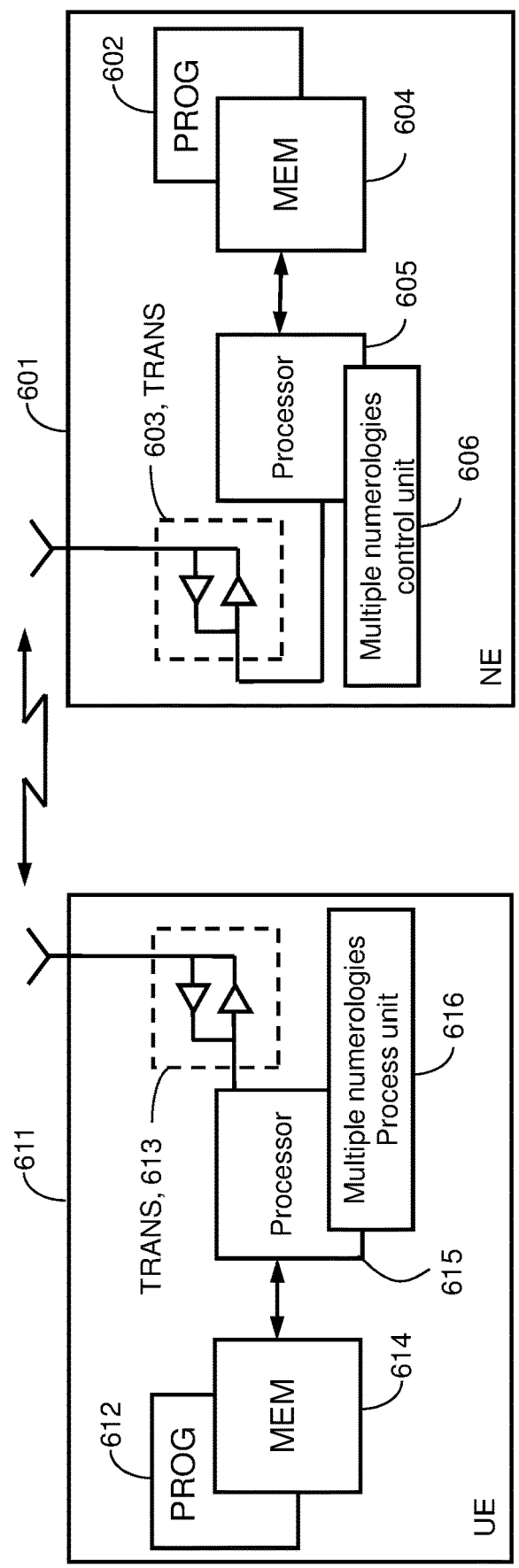
FIG. 6 illustrates a simplified block diagram of example apparatuses that are suitable for use in practicing various example embodiments of this application.

Reference is made to FIG. 6 for illustrating a simplified block diagram of various example apparatuses that are suitable for use in practicing various example embodiments of this application. In FIG. 6, a NE 601, is adapted for communication with a UE 611. The UE 611 includes at least one processor circuitry 615, at least one memory (MEM) 614 coupled to the at least one processor circuitry 615, and a suitable transceiver (TRANS) 613 (having a transmitter (TX) and a receiver (RX)) coupled to the at least one processor circuitry 615. The at least one MEM 614 stores a program (PROG) 612. The TRANS 613 is for bidirectional wireless communications with the NE 601.

The NE 601 includes at least one processor circuitry 605, at least one memory (MEM) 604 coupled to the at least one processor circuitry 605, and a suitable transceiver (TRANS) 603 (having a transmitter (TX) and a receiver (RX)) coupled to the at least one processor circuitry 605. The at least one MEM 604 stores a program (PROG) 602. The TRANS 603 is for bidirectional wireless communications with the UE 611. The NE 601 may be coupled to one or more cellular networks or systems, which is not shown in this figure.

As shown in FIG. 6, the NE 601 may further include a multiple numerologies control unit 606. The unit 606, together with the at least one processor circuitry 605 and the PROG 602, may be utilized by the NE 601 in conjunction with various example embodiments of the application, as described herein.

As shown in FIG. 6, the UE 611 may further include a multiple numerologies process unit 616. The unit 616, together with the at least one processor circuitry 615 and the PROG 612, may be utilized by the UE 611 in conjunction with various example embodiments of the application, as described herein.

At least one of the PROGs 602 and 612 is assumed to include program instructions that, when executed by the associated processor, enable the electronic apparatus to operate in accordance with the example embodiments of this disclosure, as discussed herein.

In general, the various example embodiments of the apparatus 611 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The example embodiments of this disclosure may be implemented by computer software or computer program code executable by one or more of the processor circuitries 605, 615 of the NE 601 and the UE 611, or by hardware, or by a combination of software and hardware.

The MEMs 604 and 614 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processor circuitries 605 and 615 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be flexible multiplexing of different numerologies for control information signaling with capability to limit UEs' blind detection efforts. It also allows UE to save energy since there is no need of parallel processing and control information can be received by using smaller FFT/BW.

Embodiments of the present invention may be implemented in software, hardware, application logic or a combination of software, hardware and application logic. The software, application logic and/or hardware may reside on an apparatus such as a user equipment, an eNB or other mobile communication devices. If desired, part of the software, application logic and/or hardware may reside on a network element 601, part of the software, application logic and/or hardware may reside on a UE 611, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a non-transitory computer-readable storage medium that may be any media or means that can contain or store the instructions for use by or in connection with an instruction execution system, apparatus, or device.

It is also noted herein that while the above describes example embodiments of the invention, these descriptions should not be viewed in a limiting sense. Rather, there are several variations and modifications which may be made without departing from the scope of the present invention. For example, the described example embodiments may use SCS 15 kHz and 60 kHz just as examples with different SCS. The idea scales to any scenario having separate SCS for control and data. There may also be more than two SCS options available. For example, there could be four numerology options, and the selected one(s) is indicated via the at least one symbol for control information. Generally speaking the selection may be seen as a subframe (slot) format for certain time period, and the control information can indicate the combination of numerologies selected for different portions of the subframe (slot), including optionally also the subframe (slot) length. Moreover, although the arrangement proposed above mainly focuses on the scenario where multiple numerologies are mixed in TDM manner, the principle can be applied also in the scenario of FDM multiplexing between different numerologies. In this case, the principle can be applied in the sub-band based manner.

Further, the various names and terms are not intended to be limiting in any respect Such as for example, "subframe" herein is a general term to indicate regular scheduling unit in time and it may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

We claim:
1. An apparatus, comprising:
   at least one processor; and
   at least one memory including computer program code, wherein the at least one memory and the computer program code are configured to, with the at least one processor, cause the apparatus at least to:
   generate at least one symbol of a subframe for control information based on a first subcarrier spacing;
   generate at least one data symbol of the subframe based on a second subcarrier spacing, wherein the second subcarrier spacing is different than the first subcarrier spacing; and
   transmit the subframe comprising the at least one symbol for control information and at least one data symbol.

2. The apparatus according to claim 1, wherein the number of the at least one symbol for control information depends on at least one of the length of the subframe and the second subcarrier spacing.

3. The apparatus according to claim 1, wherein the control information contains information about the second subcarrier spacing.

4. The apparatus according to claim 1, wherein the at least one memory and the computer program code are configured to, with the at least one processor, cause the apparatus to:
   when transmitting the subframe, transmit the at least one symbol for control information by using fast Fourier transform with a size smaller than that of the at least one data symbol.

5. The apparatus according to claim 1, wherein the at least one memory and the computer program code are configured to, with the at least one processor, cause the apparatus to:
   when transmitting the subframe, transmit the at least one symbol for control information by using fast Fourier transform with a size same as that of the at least one data symbol but with a bandwidth larger than that of the at least one data symbol.

6. The apparatus according to claim 1, wherein the first subcarrier and the second subcarrier are located on different sub-bands.

7. An apparatus, comprising:
   at least one processor; and at least one memory including computer program code, wherein the at least one memory and the computer program code are configured to, with the at least one processor, cause the apparatus at least to:
   receive a subframe comprising at least one symbol for control information and at least one data symbol;
   decode the at least one symbol for control information based on a first subcarrier spacing; and
   obtain from the decoded at least one symbol information regarding a second subcarrier spacing used on the at least one data symbol, wherein the second subcarrier spacing is different than the first subcarrier spacing.

8. The apparatus according to claim 7, wherein the number of the at least one symbol for control information depends on at least one of the length of the subframe and the second subcarrier spacing.

9. The apparatus according to claim 7, wherein the at least one memory and the computer program code are configured to, with the at least one processor, cause the apparatus at least to:
when receiving the subframe, receive the at least one symbol for control information by using fast Fourier transform with a size smaller than that of the at least one data symbol.

10. The apparatus according to claim 7, wherein the at least one memory and the computer program code are configured to, with the at least one processor, cause the apparatus at least to:
when receiving the subframe, receive the at least one symbol for control information by using fast Fourier transform with a size same as that of the at least one data symbol but with a bandwidth larger than that of the at least one data symbol.

11. The apparatus according to claim 7, wherein the first subcarrier and the second subcarrier are located on different sub-bands.

12. A method, comprising:
generating at least one symbol of a subframe for control information based on a first subcarrier spacing;
generating at least one data symbol of the subframe based on a second subcarrier spacing, wherein the second subcarrier spacing is different than the first subcarrier spacing; and
transmitting the subframe comprising the at least one symbol for control information and at least one data symbol.

13. The method according to claim 12, wherein the control information contains information about the second subcarrier spacing.

14. The method according to claim 12, wherein the first subcarrier spacing and the second subcarrier spacing are different.

15. A method, comprising:
receiving a subframe comprising at least one symbol for control information and at least one data symbol;
decoding the at least one symbol for control information based on a first subcarrier spacing; and
obtaining from the decoded at least one symbol information regarding a second subcarrier spacing used on the at least one data symbol, wherein the second subcarrier spacing is different than the first subcarrier spacing.

16. The method according to claim 15, wherein receiving the subframe comprising: receiving the at least one symbol for control information by using fast Fourier transform with a size smaller than that of the at least one data symbol.

17. The method according to claim 15, wherein the first subcarrier spacing and the second subcarrier spacing are different.

18. A non-transitory computer readable medium comprising program instructions for causing an apparatus to perform at least:
receiving a subframe comprising at least one symbol for control information and at least one data symbol;
decoding the at least one symbol for control information based on a first subcarrier spacing; and
obtaining from the decoded at least one symbol information regarding a second subcarrier spacing used on the at least one data symbol, wherein the second subcarrier spacing is different than the first subcarrier spacing.

* * * * *